United States Patent
Zahn et al.

(10) Patent No.: US 11,364,616 B2
(45) Date of Patent: Jun. 21, 2022

(54) RECHARGEABLE BATTERY PACK INTERFACE DEVICE

(71) Applicant: Robert Bosch GmbH, Stuttgart (DE)

(72) Inventors: Wolf Zahn, Stuttgart (DE); Florian Kneer, Duernau (DE); Josef Baumgartner, Wildberg (DE)

(73) Assignee: Robert Bosch GmbH, Stuttgart (DE)

(*) Notice: Subject to any disclaimer, the term of this patent is extended or adjusted under 35 U.S.C. 154(b) by 288 days.

(21) Appl. No.: 16/625,120

(22) PCT Filed: Jun. 20, 2018

(86) PCT No.: PCT/EP2018/066360
§ 371 (c)(1),
(2) Date: Dec. 20, 2019

(87) PCT Pub. No.: WO2018/234355
PCT Pub. Date: Dec. 27, 2018

(65) Prior Publication Data
US 2020/0139531 A1 May 7, 2020

(30) Foreign Application Priority Data
Jun. 22, 2017 (DE) .......................... 102017210557.7

(51) Int. Cl.
*B25F 5/02* (2006.01)
*B23B 45/02* (2006.01)
(Continued)

(52) U.S. Cl.
CPC .............. *B25F 5/023* (2013.01); *B23B 45/02* (2013.01); *H01M 10/425* (2013.01);
(Continued)

(58) Field of Classification Search
CPC . B25F 5/023; B25F 5/02; B23B 45/02; B23B 2260/024; H01M 10/425;
(Continued)

(56) References Cited

U.S. PATENT DOCUMENTS 7,598,705 B2 * 10/2009 Watson ..................... B25F 5/02
320/114
8,827,131 B2 * 9/2014 Zahner ..................... B25C 7/00
227/8
(Continued)

FOREIGN PATENT DOCUMENTS

| CN | 1262975 A | 8/2000 |
| CN | 1406699 A | 4/2003 |

(Continued)

OTHER PUBLICATIONS

International Search Report dated Sep. 17, 2018 of the corresponding International Application PCT/EP2018/066360 filed Jun. 20, 2018.

*Primary Examiner* — M Baye Diao
(74) *Attorney, Agent, or Firm* — Norton Rose Fulbright US LLP; Gerard Messina

(57) ABSTRACT

A rechargeable battery pack interface device includes: at least one connecting unit that is designed to detachably mechanically connect a rechargeable battery pack to a consumer, the mechanical connection being detachable using a relative movement of the rechargeable battery pack relative to the consumer; and a retaining unit that is designed in such a way that, in a non-activated state of the retaining unit, the mechanical connection is detachable using the relative movement of the rechargeable battery pack with respect to the consumer and, in an activated state of the retaining unit, the mechanical connection is detachable using another relative movement which differs from the relative movement.

15 Claims, 6 Drawing Sheets

(51) Int. Cl.
*H01M 10/42* (2006.01)
*H01M 50/213* (2021.01)

(52) U.S. Cl.
CPC ..... *H01M 50/213* (2021.01); *B23B 2260/024* (2013.01); *H01M 2220/30* (2013.01)

(58) Field of Classification Search
CPC .......... H01M 50/213; H01M 2220/30; H01M 50/581; H01M 2200/103; Y02E 60/10
USPC ....................................................... 320/114
See application file for complete search history.

(56) References Cited

U.S. PATENT DOCUMENTS

| | | | | |
|---|---|---|---|---|
| 10,797,281 | B2 * | 10/2020 | Dietel | ...................... B25F 5/00 |
| 2001/0000945 | A1 | 5/2001 | Watson et al. | |
| 2016/0172641 | A1 * | 6/2016 | Zahn | .................. H01M 50/247 |
| | | | | 429/97 |

FOREIGN PATENT DOCUMENTS

| | | | | |
|---|---|---|---|---|
| CN | 206040735 U | 3/2017 | | |
| DE | 102006058825 A1 | 7/2007 | | |
| DE | 202012013284 U1 | 12/2015 | | |
| DE | 202012013284 U1 * | 1/2016 | .......... | H01M 2/1022 |
| DE | 102014225998 A1 * | 6/2016 | ................ | B25F 5/00 |
| DE | 102016205567 A1 | 6/2017 | | |
| DE | 202017105258 U1 | 9/2017 | | |
| EP | 2511970 | 10/2012 | | |
| EP | 2562844 | 2/2013 | | |

* cited by examiner

RECHARGEABLE BATTERY PACK INTERFACE DEVICE

CROSS-REFERENCE TO RELATED APPLICATIONS

The present application is the national stage of International Pat. App. No. PCT/EP2018/066360 filed Jun. 20, 2018, and claims priority under 35 U.S.C. § 119 to DE 10 2017 210 557.7, filed in the Federal Republic of Germany on Jun. 22, 2017, the content of each of which are incorporated herein by reference in their entireties.

BACKGROUND

Hand-held power tools and rechargeable battery packs including a rechargeable battery pack interface device are known.

SUMMARY

The present invention relates to a rechargeable battery pack interface device including at least one connecting unit that is designed to detachably mechanically connect a rechargeable battery pack to a consumer, the mechanical connection being detachable using a relative movement of the rechargeable battery pack with respect to the consumer. The rechargeable battery pack interface device includes a retaining unit that is designed in such a way that, in a non-activated state of the retaining unit, the mechanical connection is detachable using the relative movement of the rechargeable battery pack with respect to the consumer and, in an activated state of the retaining unit, the mechanical connection is detachable using another relative movement which differs from the relative movement. Damage as a result of the detachment of the connection can advantageously be prevented by the retaining unit in the event of a high mechanical load on a rechargeable battery pack connected to the consumer, for example when dropped.

The rechargeable battery pack interface device can be designed as part of a rechargeable battery pack or as part of a consumer. In addition or as an alternative, the rechargeable battery pack interface device is designed as part of an adapter using which the rechargeable battery pack is connectable to the consumer. The adapter is, in particular, situated between the rechargeable battery pack and the consumer. The consumer can, in particular, be designed as a portable device. The consumer is preferably designed as a garden device, such as a lawn mower or a hedge trimmer, as a hand-held power tool, such as an angle grinder, a power screwdriver, a drill, a hammer drill, and the like, or as a measuring tool, such as a laser distance measuring device. As an alternative, the consumer can be designed as a radio, as a lamp, or as an exhaust. The rechargeable battery pack interface device is, in particular, intended for a system made up of a rechargeable battery pack and a hand-held power tool, in which the weight proportion of the rechargeable battery pack is at least ⅛ of the total weight, preferably at least ¼ of the total weight, preferably at least ⅓ of the total weight. In the case of such weight proportions, a very high load on the mechanical connection can occur, due to the high weight of the rechargeable battery pack and the mass inertia of the rechargeable battery pack, in the event the system is dropped that can result in non-reversible damage to the mechanical connection.

The connecting unit of the rechargeable battery pack interface device is, in particular, designed to establish a force-fit and/or form-locked connection with a corresponding mechanical interface. The connecting unit of the rechargeable battery pack interface device and the corresponding mechanical interface are each situated on one of the devices to be detachably connected to each other. As an alternative, the corresponding mechanical interface is also designed as a connecting unit of a further rechargeable battery pack interface device. In this context, a detachable connection means a connection which is non-destructively detachable without tools. The connecting unit of the rechargeable battery pack interface device or the corresponding mechanical interface advantageously includes at least one actuating element using which the connection of the rechargeable battery pack to the consumer is releasably fixable.

The rechargeable battery pack furthermore includes at least one rechargeable battery cell and an electrical interface using which the at least one rechargeable battery cell is electrically connectable to the consumer. The rechargeable battery cell is designed as a galvanic cell that has a design in which one cell pole ends up at one end, and another cell pole ends up at an opposite end. In particular, the rechargeable battery cell has a positive cell pole at one end and a negative cell pole at an opposite end. The rechargeable battery cells are preferably designed as NiCd or NiMh rechargeable battery cells, particularly preferably as lithium-based rechargeable battery cells. The rechargeable battery voltage of the rechargeable battery pack is generally a multiple of the voltage of an individual rechargeable battery cell and results from the (parallel or series) connection of the rechargeable battery cells. For conventional rechargeable battery cells having a voltage of 3.6 V, this results in an exemplary rechargeable battery voltage of 3.6 V, 7.2 V, 10.8 V, 14.4 V, 18 V, 36 V, 54 V, 108 V, and the like. The rechargeable battery cell is preferably designed as an at least essentially cylindrical round cell, the cell poles being situated on ends of the cylinder shape. The electrical interface includes, in particular, at least two electrical contact elements that are designed to transfer energy. As an alternative or in addition, the electrical interface can include a secondary charging coil element for inductive charging. In addition, the electrical interface can include further contact elements designed to transmit to the consumer additional pieces of information that are preferably ascertained using the electronic system. This can be, for example, a charge state of the rechargeable battery pack, a temperature within the rechargeable battery pack, a coding, or a remaining capacity of the rechargeable battery pack. In an example embodiment, the electronic system regulates or controls the charging and/or discharging process of the rechargeable battery pack. The electronic system can, for example, include at least one circuit board, a processing unit, a transistor, a capacitor, and/or a memory. The electronic system can moreover include one or multiple sensor element(s), for example for ascertaining the temperature within the rechargeable battery pack. As an alternative or in addition, the electronic system can include a coding element, such as a coding resistor.

The relative movement takes place, in particular, from a connected state into a detached state. In the connected state, the rechargeable battery pack is, in particular, electrically connected to the consumer. In the connected state, the rechargeable battery pack is preferably fixed on the hand-held power tool, the fixation being releasable using the actuating element. The actuating element can, for example, be designed as a button, a lever or a pushbutton. In the detached state, the rechargeable battery pack is not electrically connected to the consumer. In the detached state, the rechargeable battery pack is, in particular, not in mechanical contact with the consumer. The connecting unit is preferably designed in such a way that the relative movement for detaching the rechargeable battery pack corresponds to the opposite relative movement for connecting the rechargeable battery pack.

The retaining unit is, in particular, designed to be activatable using an application of a force onto the rechargeable battery pack and/or onto the consumer, the application of the force onto the rechargeable battery pack preferably differing from the application of the force onto the consumer. The effective direction of the force for activating the retaining unit is, in particular, designed to be different from the relative movement.

Furthermore, it is provided that the relative movement is designed to be translatory and/or rotatory. In particular, the relative movement has up to three translatory and up to three rotatory freedoms of movement that are independent of one another. The total number of freedoms of movement defines the degree of freedom of the relative movement. A relative movement having one, two, or three translatory freedom(s) of movement extends linearly along a line, on a plane, or in a space. A relative movement having one, two, or three rotatory freedom(s) of movement extends in a rotating manner about one, about two, or about three rotation axis/axes perpendicular to one another. The degree of freedom of the relative movement is preferably a maximum of five.

Furthermore, it is provided that the relative movement has a single freedom of movement. The connection can thus advantageously be detached by a simple sequence of motions. In particular, the relative movement has a degree of freedom of one, having a single rotatory freedom of movement. By way of example, the connection can be detached by a pivoting movement. The relative movement preferably has a degree of freedom of one, having a single translatory freedom of movement. By way of example, the connection can be detached by a pushing-out.

Moreover, it is provided that the other relative movement is designed to be translatory and/or rotatory. In particular, the other relative movement for detaching the connection between the rechargeable battery pack and the consumer has a different degree of freedom compared to the relative movement. In particular, the degree of freedom of the other relative movement is increased by one. The other relative movement preferably has at least one other freedom of movement than the relative movement. If the relative movement has a translatory freedom of movement, the other relative movement, instead of this or in addition, can have a rotatory freedom of movement or a different translatory freedom of movement, and vice versa.

Furthermore, it is provided that the connecting unit includes a movably mounted retaining element. The retaining element can be designed to be mounted in a translatory and/or rotatory manner. In the activated state of the retaining unit, the retaining element is situated in a different position than in the non-activated state of the retaining unit.

Furthermore, it is provided that the retaining element is mounted pivotably about a pivot axis that extends, in particular, along the relative movement. In this way, a very compact rechargeable battery pack interface device can advantageously be implemented. The opening angle of the pivoting movement about the pivot axis is preferably limited using at least one stop element, preferably using two stop elements. The maximum opening angle is, in particular, essentially 180°, preferably essentially 90°.

Moreover, it is provided that the retaining unit includes a restoring element that applies a force onto the retaining element. In particular, the restoring element applies a force onto the retaining element in such a way that the retaining element remains in a non-activated state. As an alternative or in addition, it is also conceivable that the restoring element applies a force onto the retaining element counter to a movement direction along which the retaining element moves from the non-activated into the activated state. The restoring element preferably acts directly on the retaining element. However, it is also conceivable for the restoring element to indirectly apply a force onto the retaining element, for example, using at least one other component. An activation of the retaining unit takes place, in particular, if a force on the movable retaining element exceeds a limiting value. The limiting value is essentially established by the force with which the restoring element acts on the retaining element.

Furthermore, it is provided that the retaining element is designed as a guide rail. In this way, the rechargeable battery pack interface device can advantageously be guided by the retaining element during the relative movement.

Furthermore, it is provided that the restoring element is designed as a detent ball or as a leg spring. In this way, a high restoring force can advantageously be achieved on the retaining element. As an alternative, the restoring element can also be designed as a leaf spring, as a torsion spring, as a torsion rod and the like.

Further advantages are derived from the following description of the drawings. The drawings, the description, and the claims include numerous features in combinations. Those skilled in the art will advantageously also consider the features individually and combine them into useful further combinations.

DETAILED DESCRIPTION

Figure 1:
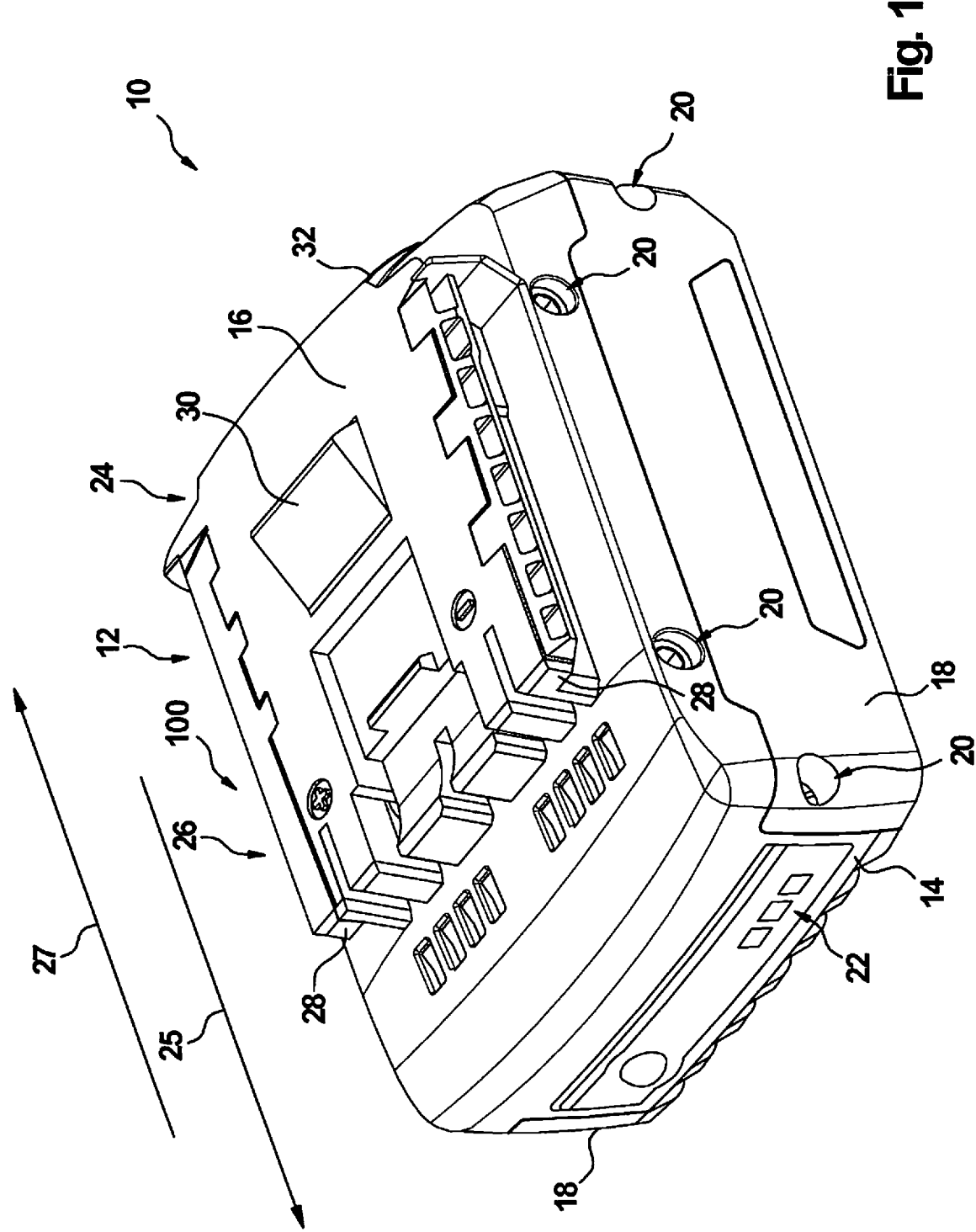
FIG. 1 shows a perspective view of a rechargeable battery pack including a rechargeable battery pack interface device according to an example embodiment of the present invention.

FIG. 1 shows a rechargeable battery pack 10 including a rechargeable battery pack interface device 100 in a perspective view. Rechargeable battery pack 10 is designed as a rechargeable battery pack for a hand-held power tool, by way of example, and is designed to be electrically and mechanically connectable to a consumer 200 designed as a hand-held power tool 210 (see FIG. 6) in such a way that hand-held power tool 210 can be supplied with energy via rechargeable battery pack 10. Rechargeable battery pack 10 includes a housing 12 that has a multi-piece design. Housing 12 includes a base body 14 on its lower side, an interface housing part 16 on its upper side, and two opposing side walls 18 on its lateral surfaces. Housing parts 14, 16, 18 are connected to one another by screw joints 20.

A charge state display 22, using which the charge state of rechargeable battery pack 10 is displayable, is situated on the front side of rechargeable battery pack 10. Charge state display 22 is integrated into housing 12, in particular, into base body 14. Housing 12, in particular, interface housing part 16, includes rechargeable battery pack interface device 100 including a connecting unit 24 and an electrical interface 26. Connecting unit 24 and electrical interface 26 are designed for detachably attaching and for electrically connecting rechargeable battery pack 10 to hand-held power tool 210 or to an adapter 300 (see FIG. 6) that each includes a corresponding mechanical and electrical interface.

Rechargeable battery pack 10 is designed as a sliding rechargeable battery pack, by way of example. During the attachment of rechargeable battery pack 10, receiving means, e.g., guide grooves and guide ribs, of hand-held power tool 210 or of adapter 300 for accommodating corresponding retaining elements 28 of connecting unit 24 are made to engage therewith, rechargeable battery pack 10 being inserted using a relative movement 25 of rechargeable battery pack 10 with respect to hand-held power tool 210 or with respect to adapter 300 along the receiving means, and retaining elements 28 of rechargeable battery pack 10 being pushed into corresponding mechanical interface 126 of hand-held power tool 210 or into corresponding interface 126 of adapter 300 (see FIG. 6). Relative movement 25 for connecting rechargeable battery pack 10 and a relative movement 27 for detaching rechargeable battery pack 10 each has a degree of freedom of one. In particular, relative movements 25, 27 each has a single translatory freedom of movement that are identically designed. Relative movement 25 for connecting rechargeable battery pack 10 is counter to relative movement 27 for detaching rechargeable battery pack 10.

Connecting unit 24 includes a locking element 30 for locking rechargeable battery pack 10 to hand-held power tool 210 or to adapter 300. Locking element 30 is designed as a spring-loaded detent element that is pivotably mounted in housing 12 of rechargeable battery pack 10. The locking takes place by pushing in rechargeable battery pack 10 along relative movement 25, locking element 30 engaging in an undercut position at the end of the relative movement. Connecting unit 24 includes an actuating element 32, designed as a pushbutton that is movably coupled to locking element 30, for releasing the lock. As a result of an actuation of actuating element 32, locking element 30 moves into housing 12 of rechargeable battery pack 10, and the lock between rechargeable battery pack 10 and hand-held power tool 210 or adapter 300 is released, so that rechargeable battery pack 10 can be detached with relative movement 27.

At least one rechargeable battery cell 34 (see FIG. 3) is accommodated in housing 12 of rechargeable battery pack 10, rechargeable battery pack 10 in this example embodiment including, by way of example, ten rechargeable battery cells 34 connected in parallel or serially. The connection of rechargeable battery cells 34 among one another is achieved by current collectors (not shown) designed as cell connectors. The current collectors are designed for electrically interconnecting rechargeable battery cells 34 in a parallel and/or series connection. An electronic system 38 (see FIG. 6) is situated in the area between base body 14 and interface housing part 16. Electronic system 38 includes a circuit board 40. Electronic system 38 is connected to charge state display 22. Electrical contact elements (not shown) that are provided for charging and discharging rechargeable battery pack 10, and further contact elements (not shown) that are designed to transmit state information, such as the charge state or the temperature of rechargeable battery pack 10, to hand-held power tool 210, are situated on circuit board 40. The electrical contact elements and the further contact elements are assigned to electrical interface 26. The electrical contact elements are connected to electronic system 38 and to rechargeable battery cells 34.

Figure 2:
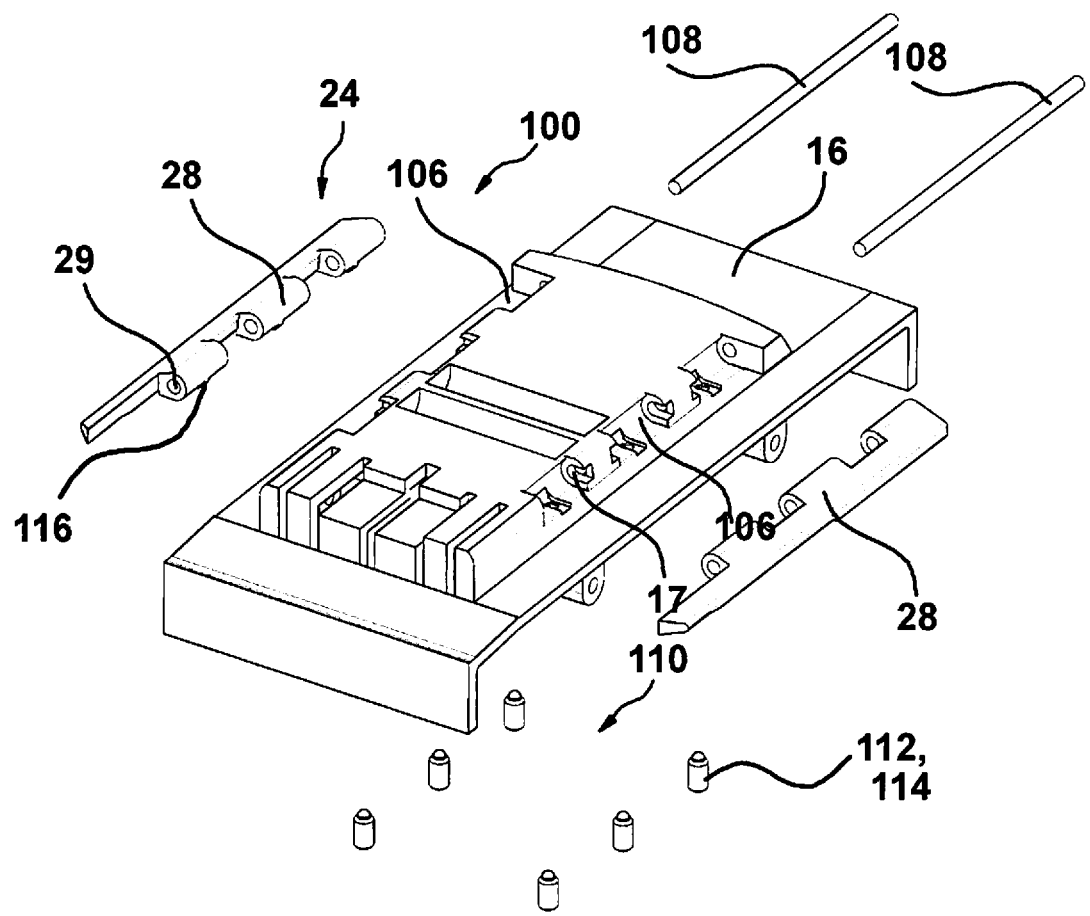
FIG. 2 shows an exploded drawing of the rechargeable battery pack interface device of FIG. 1, according to an example embodiment of the present invention

FIG. 2 shows interface housing part 16 and rechargeable battery pack interface device 100 connectable to interface housing part 16 in an exploded drawing. Retaining element 28 of connecting unit 24 is mounted pivotably about a pivot axis 104 (see FIG. 3) using a swivel joint 102. Retaining element 28 is designed as a guide rail which extends, in particular, along relative movement 25, 27. Pivot axis 104 extends along relative movement 25, 27 or along the longitudinal extension of the guide rail. Retaining element 28 is partially situated in a recess 106 of interface housing part 16. Interface housing part 16 and retaining element 28 each has a cross borehole 17, 29 in which a rod-shaped connecting element 108 engages. Retaining element 28 is pivotably connected to interface housing part 16 using connecting element 108. Furthermore, rechargeable battery pack interface device 100 includes a retaining unit 110 that includes multiple restoring elements 114 designed as detent balls 112. Restoring elements 114 are situated within housing 12 of rechargeable battery pack 10. Restoring elements 114 are movably mounted in housing 12 of rechargeable battery pack 10 in a translatory manner.

Figure 3:
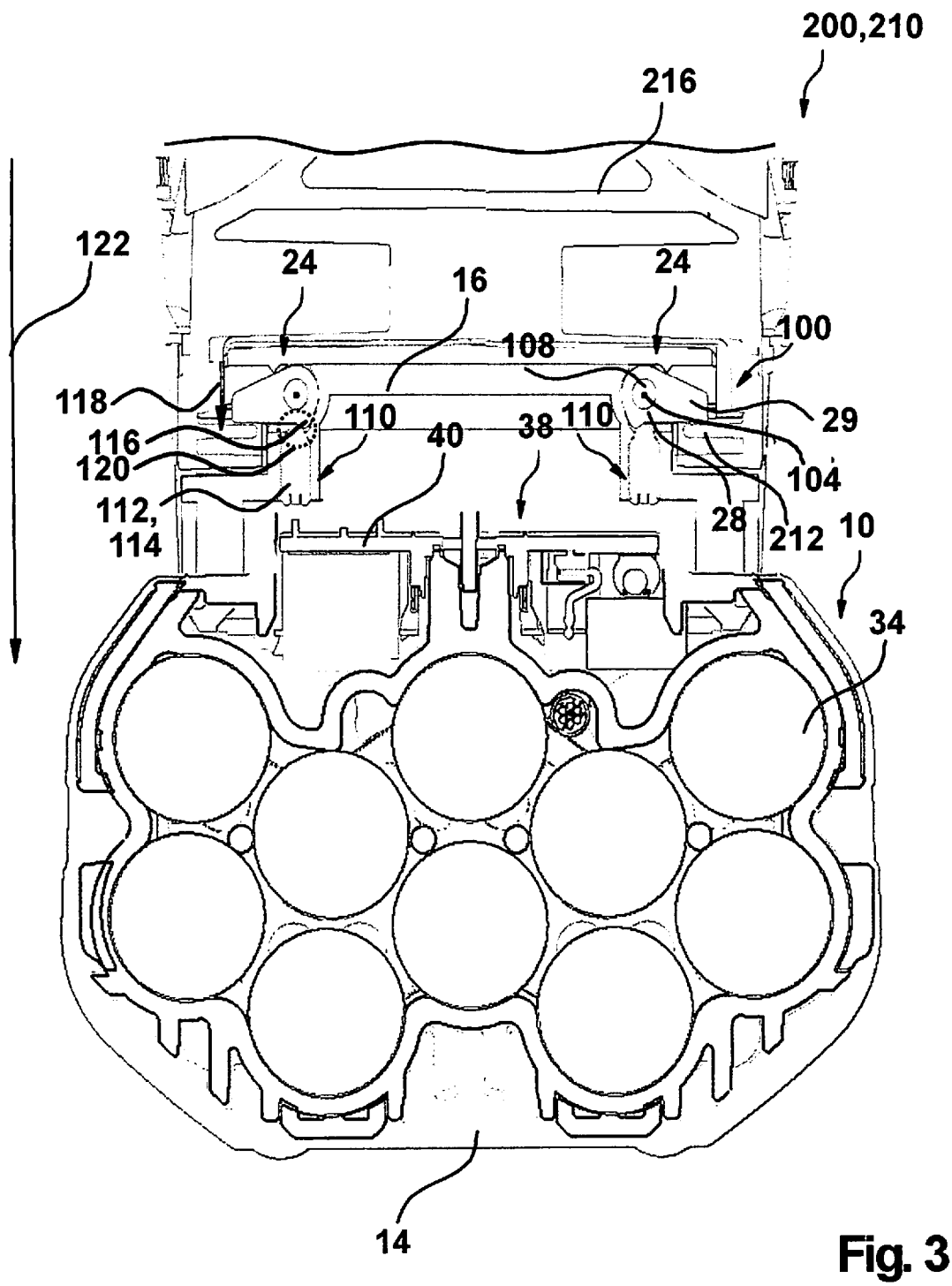
FIG. 3 shows a cross section through the rechargeable battery pack connected to a hand-held power tool, with the rechargeable battery pack interface device in the non-actuated state, according to an example embodiment of the present invention.

FIG. 3 shows a cross section through rechargeable battery pack 10 in the state connected to hand-held power tool 210. In the connected state, rechargeable battery pack 10 is pushed in completely along relative movement 25. FIG. 3 shows retaining unit 110 in the non-activated state. In the connected state, rechargeable battery pack 10 is fixed on hand-held power tool 210 using locking element 30. In the connected state, rechargeable battery pack 10 is electrically connected to hand-held power tool 210. In the cross section, retaining element 28 includes a lobe-shaped area 29. Retaining element 28 furthermore includes a stop 116 against which restoring element 114 rests in the connected state.

Furthermore, in the connected state, retaining element 28, in particular, lobe-shaped area 29 of retaining element 28, rests against a housing part 212 of hand-held power tool 210 forming a guide groove in the case of a non-activated retaining unit 110. Housing part 212 is designed as a guide rib. Retaining element 28 is at least partially accommodated in the guide groove essentially without play.

The pivoting movement of retaining element 28 is limited by housing part 212 of hand-held power tool 210 in one direction, and by restoring element 114 resting against stop 116 in the other direction. In the direction limited by housing part 212, the pivoting movement of retaining element 28 is limited in the direction of rechargeable battery pack 10. In the direction limited by restoring element 114 resting against stop 116, the pivoting movement of retaining element 28 is limited in the direction of hand-held power tool 210.

To transfer rechargeable battery pack 10 from the connected state into a detached state in the case of a non-activated retaining unit 110, initially the fixation by the locking element 30 is released, and, in a further step, rechargeable battery pack 10 is pushed out using relative movement 27. Since the fixation by locking element 30 is generally only releasable by a deliberate actuation by the user, very high forces that can result in damage to housing 12 of rechargeable battery pack 10 and/or to housing part 212 of hand-held power tool in the area of the mechanical connection, act in the area of the mechanical connection in the event that rechargeable battery pack 10 connected to hand-held power tool 210 is dropped. Retaining unit 110 is advantageously designed in such a way that it is, in particular, automatically actuated when a high force is applied onto housing 12 of rechargeable battery pack 10 and/or housing part 212 of hand-held power tool 210. If dropped, a high force application 118 occurs due to the mass inertia of rechargeable battery pack 10 which, proceeding from lobe-shaped area 29 of retaining element 28, acts on housing part 212 of hand-held power tool 210. If force 118 is greater than a frictional force 120 acting between restoring element 114 and stop 116, retaining unit 110 is activated in that restoring element 114 is displaced, in particular, inwardly displaced. In the activated state of retaining unit 110, retaining element 28 moves in the direction of hand-held power tool 210. In particular, retaining element 28 moves out of the guide groove. As a result of the release of retaining element 28 from the guide groove, the connection between rechargeable battery pack 10 and hand-held power tool 210 can be detached using another relative movement 122 which, in particular, takes place essentially perpendicularly to relative movement 27. Other relative movement 122 has a single translatory freedom of movement that extends along the effective direction of restoring element 114.

Figure 4:
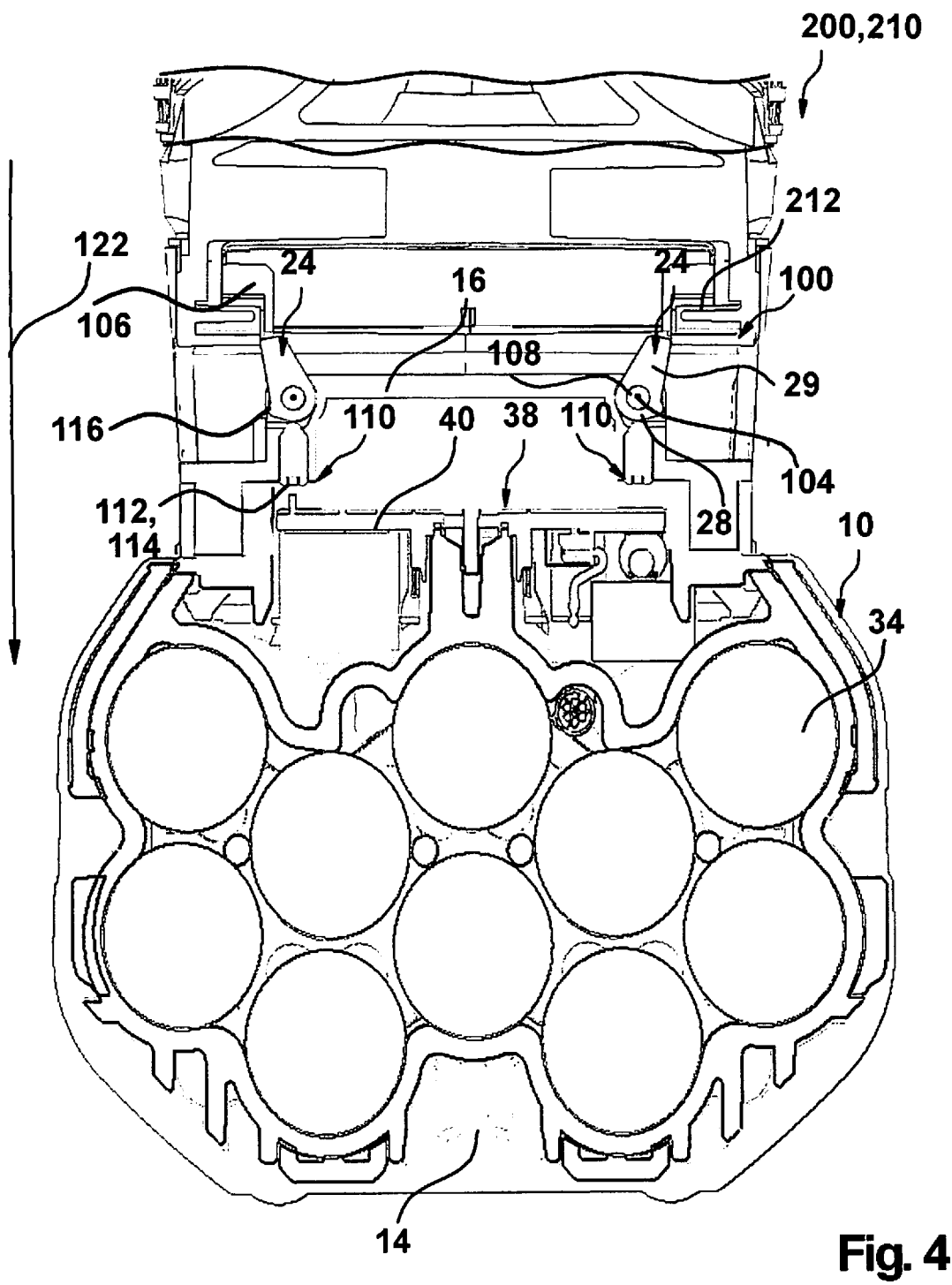
FIG. 4 shows a cross section through the rechargeable battery pack detached from the hand-held power tool, with the rechargeable battery pack interface device in the actuated state, according to an example embodiment of the present invention.

FIG. 4 shows a cross section through rechargeable battery pack 10 in the state not connected to hand-held power tool 210, retaining unit 110 being in an activated state. The outer contour of retaining element 28 can advantageously be shaped in such a way that, in the detached state, retaining element 28 automatically engages in the non-activated state, so that rechargeable battery pack 10 can be connected to hand-held power tool 210 again using relative movement 25.

Figure 5:
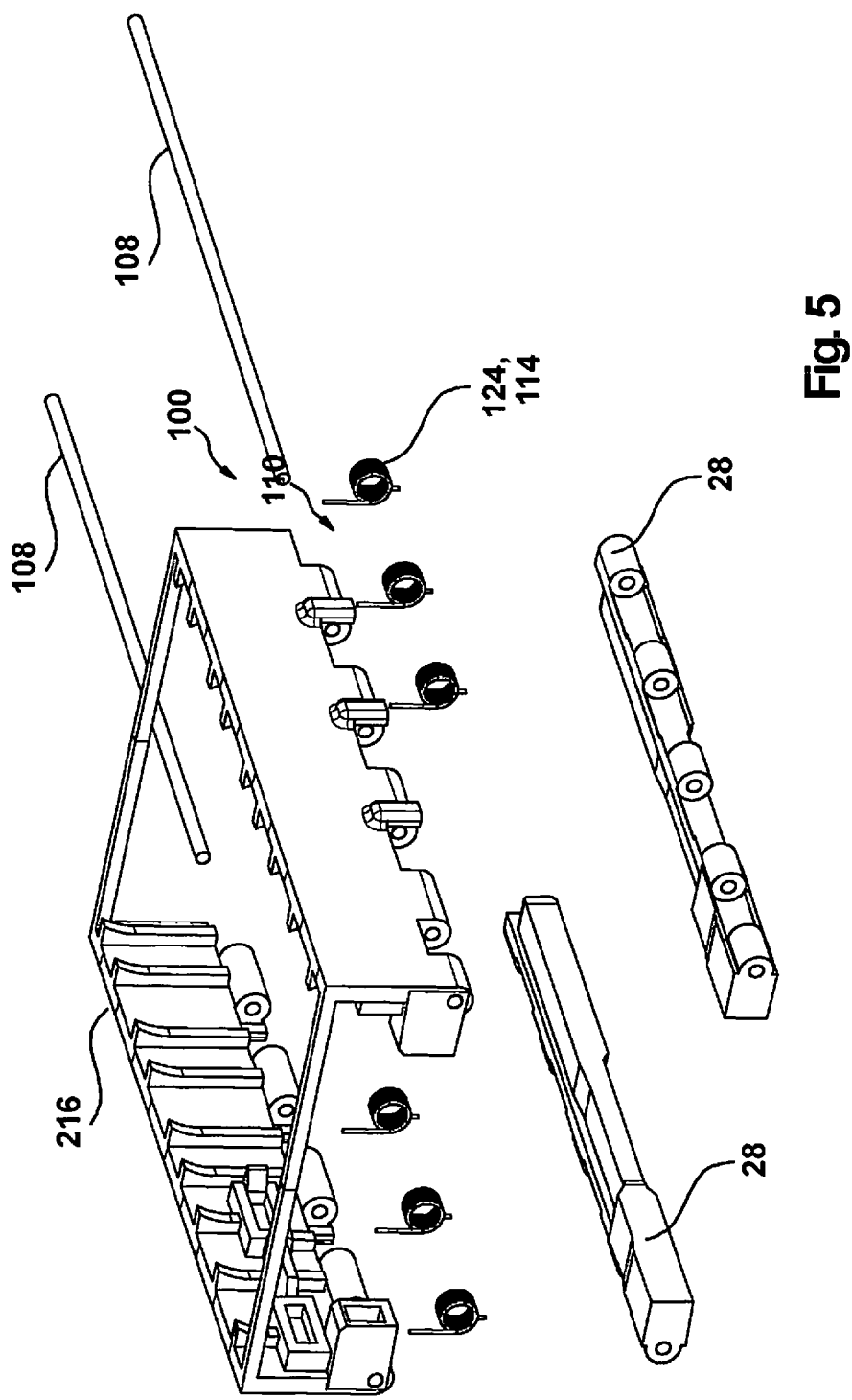
FIG. 5 shows an exploded drawing of the rechargeable battery pack interface device, according to an alternative example embodiment of the present invention.

FIG. 5 shows an alternative example embodiment of rechargeable battery pack interface device 100 in an exploded drawing. In this example embodiment, the arrangement of rechargeable battery pack interface device 100 differs. Rechargeable battery pack interface device 100 is situated on a base 216 of hand-held power tool 210 and is connectable to a corresponding interface (not shown) of rechargeable battery pack 10. As was already described above, retaining element 28 is designed as a guide rail and connected to the base of hand-held power tool 210 using a connecting element 108. As a further distinction, restoring element 114 is designed as a leg spring 124 in this example embodiment that is situated in such a way that a force is applied onto retaining element 28 in the direction of the non-actuated state. The detachment process using retaining unit 110 in this example embodiment takes place essentially similarly to the preceding example embodiment.

Figure 6:
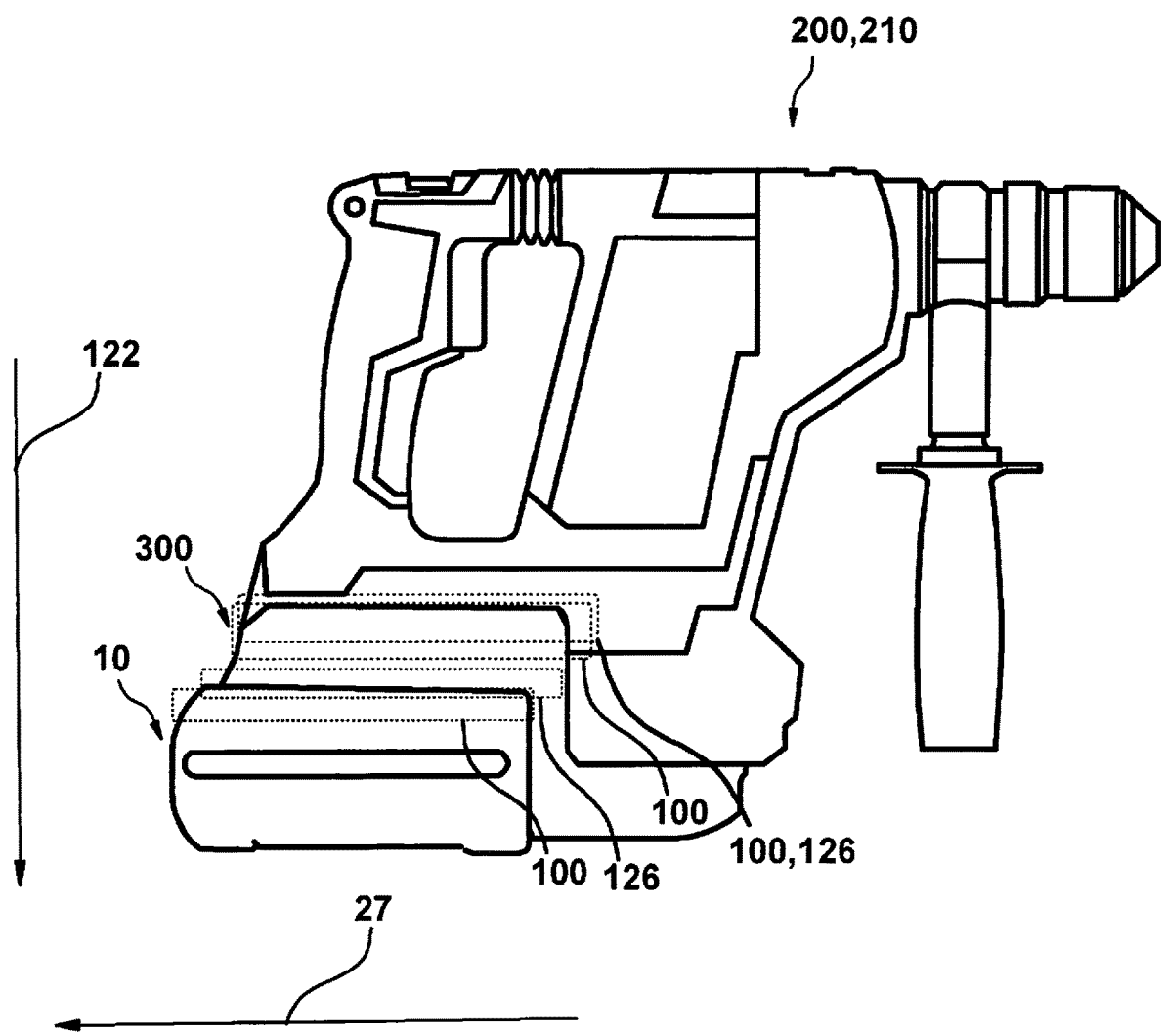
FIG. 6 shows a system made up of a hand-held power tool, an adapter and a rechargeable battery pack, according to an example embodiment of the present invention.

FIG. 6 shows a rechargeable battery pack 10 that is connected to hand-held power tool 210 using an adapter 300, by way of example. Hand-held power tool 210 is designed as a hammer drill including a rechargeable battery, by way of example. Rechargeable battery pack interface device 100 according to the present invention can be situated on rechargeable battery pack 10, on adapter 300, and/or on hand-held power tool 210, connecting unit 24 of rechargeable battery pack interface device 100 being connected to a corresponding mechanical interface 126 or to another connecting unit 24 of rechargeable battery pack interface device 100.

What is claimed is:

1. A rechargeable battery pack interface device comprising:
   at least one connecting unit via which a rechargeable battery pack is mechanically connectable to a consumer; and
   a retaining unit, wherein:
      in a non-activated state of the retaining unit, the mechanical connection is severable by a first movement of the rechargeable battery pack relative to the consumer; and
      in an activated state of the retaining unit, the mechanical connection is severable by a second movement of the rechargeable battery pack relative to the consumer, wherein the second movement is different from the first movement.

2. The rechargeable battery pack interface device of claim 1, wherein the first movement is translatory and/or rotatory.

3. The rechargeable battery pack interface device of claim 1, wherein the first movement has a single freedom of movement.

4. The rechargeable battery pack interface device of claim 1, wherein the second movement is translatory and/or rotatory.

5. The rechargeable battery pack interface device of claim 1, wherein the connecting unit includes a movably mounted retaining element.

6. The rechargeable battery pack interface device of claim 5, wherein the retaining element is mounted pivotably about a pivot axis that extends in a direction of the first movement.

7. The rechargeable battery pack interface device of claim 5, wherein the retaining unit includes a restoring element that applies a force onto the retaining element.

8. The rechargeable battery pack interface device of claim 5, wherein the retaining unit includes a restoring element that applies a force onto the retaining element by which the retaining element is retained in the non-activated state.

9. The rechargeable battery pack interface device of claim 8, wherein the restoring element is a detent ball.

10. The rechargeable battery pack interface device of claim 8, wherein the restoring element is a leg spring.

11. The rechargeable battery pack interface device of claim 5, wherein the retaining element is designed as a guide rail.

12. The rechargeable battery pack interface device of claim 1, wherein the connecting unit includes a movably mounted retaining element, which is a guide rail.

13. A rechargeable battery pack comprising a rechargeable battery pack interface device, the rechargeable battery pack interface device including:
   at least one connecting unit via which the rechargeable battery pack is mechanically connectable to a consumer; and
   a retaining unit, wherein:
      in a non-activated state of the retaining unit, the mechanical connection is severable by a first movement, which is of the rechargeable battery pack relative to the consumer; and
      in an activated state of the retaining unit, the mechanical connection is severable by a second movement of the rechargeable battery pack relative to the consumer, wherein the second movement is different from the first movement.

14. The rechargeable battery pack of claim 13, wherein the rechargeable battery pack is configured for a hand-held power tool.

15. A hand-held power tool comprising:
- a body;
- rechargeable battery pack;
- an adapter situated between the rechargeable battery pack and the body; and
- a rechargeable battery pack interface device that includes:
    - at least one connecting unit via which the rechargeable battery pack is mechanically connectable to a consumer; and
    - a retaining unit, wherein:
        - in a non-activated state of the retaining unit, the mechanical connection is severable by a first movement, which is of the rechargeable battery pack relative to the consumer; and
        - in an activated state of the retaining unit, the mechanical connection is severable by a second movement of the rechargeable battery pack relative to the consumer, wherein the second movement is different from the first movement.

\* \* \* \* \*